United States Patent
Bharadwaj et al.

(10) Patent No.: US 9,544,122 B2
(45) Date of Patent: Jan. 10, 2017

(54) TECHNIQUES FOR OUTER LOOP MANAGEMENT IN A MULTIPLE OUTPUT SYSTEM

(71) Applicant: QUALCOMM Incorporated, San Diego, CA (US)

(72) Inventors: Arjun Bharadwaj, San Diego, CA (US); Dung Ngoc Doan, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 14/543,839

(22) Filed: Nov. 17, 2014

(65) Prior Publication Data

US 2015/0139125 A1     May 21, 2015

Related U.S. Application Data

(60) Provisional application No. 61/905,801, filed on Nov. 18, 2013.

(51) Int. Cl.
*H04L 5/00* (2006.01)
*H04W 72/04* (2009.01)
(Continued)

(52) U.S. Cl.
CPC .......... *H04L 5/0057* (2013.01); *H04L 1/0026* (2013.01); *H04L 1/0031* (2013.01); *H04L 1/20* (2013.01);
(Continued)

(58) Field of Classification Search
CPC .... H04L 5/0055; H04L 5/0057; H04L 1/0026; H04L 1/0031; H04L 1/20; H04L 1/1607; H04W 72/06; H04W 72/0413
See application file for complete search history.

(56) References Cited

U.S. PATENT DOCUMENTS

| | | |
|---|---|---|
| 6,983,166 B2 | 1/2006 | Shiu et al. |
| 2004/0266358 A1 | 12/2004 | Pietraski et al. |
| (Continued) | | |

FOREIGN PATENT DOCUMENTS

| | | |
|---|---|---|
| WO | WO-03/017527 A2 | 2/2003 |
| WO | WO-2008/143423 A1 | 11/2008 |
| WO | WO-2012/163198 A1 | 12/2012 |

OTHER PUBLICATIONS

International Search Report and Written Opinion—PCT/US2014/066219—ISA/EPO—Jan. 26, 2015. (11 total pages).

*Primary Examiner* — Habte Mered
(74) *Attorney, Agent, or Firm* — Arent Fox LLP

(57) ABSTRACT

An example method may include decoding, at a UE, a downlink data transmission and determining, over each of multiple streams including a single stream and two dual streams, whether to transmit an acknowledge (ACK) or a negative acknowledge (NACK) message to a base station based on a result of the decoding. Further, the example method may include calculating a signal noise ratio (SNR) value for adjusting each of the multiple streams based on the determining. Further still, the example method may include mapping the calculated SNR value of the single stream to a first channel quality indicator (CQI) value. Moreover, the example method may include mapping the calculated SNR value of the two dual streams to a second CQI value. In addition, the example method may include transmitting the first CQI value and the second CQI value to the base station.

28 Claims, 8 Drawing Sheets

(51) Int. Cl.
*H04W 72/06* (2009.01)
*H04L 1/00* (2006.01)
*H04L 1/20* (2006.01)
*H04L 1/16* (2006.01)

(52) U.S. Cl.
CPC ........ *H04L 5/0055* (2013.01); *H04W 72/0413* (2013.01); *H04W 72/06* (2013.01); *H04L 1/1607* (2013.01)

(56) References Cited

U.S. PATENT DOCUMENTS

| 2009/0238086 | A1* | 9/2009 | Ringstrom | H04B 7/0417 370/252 |
| 2011/0085511 | A1* | 4/2011 | Fan | H04L 1/0031 370/329 |
| 2011/0194504 | A1* | 8/2011 | Gorokhov | H04B 7/0417 370/329 |
| 2013/0136090 | A1* | 5/2013 | Liu | H04L 1/0002 370/329 |
| 2014/0369283 | A1* | 12/2014 | Ge | H04B 7/0452 370/329 |

* cited by examiner

TECHNIQUES FOR OUTER LOOP MANAGEMENT IN A MULTIPLE OUTPUT SYSTEM

CLAIM OF PRIORITY

The present Application for Patent claims priority to U.S. Provisional Application No. 61/905,801 entitled "DOWNLINK MIMO ENHANCEMENTS BY OUTER-LOOP MODIFICATIONS" filed Nov. 18, 2013, assigned to the assignee hereof and hereby Expressly incorporated herein by reference.

BACKGROUND

The described aspects relate generally to wireless communication systems. More particularly, the described aspects relate to techniques for outer loop management in a multiple output (MO) system.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSDPA), which provides higher data transfer speeds and capacity to associated UMTS networks.

For MO systems that include a single stream and other multiple streams, a same processing scheme to process the single stream and the multiple streams may be inefficient. For example, due to the varying granularity between the channel quality indicator (CQI) for the single stream and the multiple streams, changes in channel conditions may not be readily reflected in the CQI Improvements in MO systems that include a single stream and other multiple streams are required.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents examples of techniques for outer loop management in an MO system. An example method may include decoding, at a UE, a downlink data transmission. Additionally, the example method may include determining, over each of multiple streams including a single stream and two dual streams, and wherein the two dual streams include a primary stream and a secondary stream, whether to transmit an acknowledge (ACK) or a negative acknowledge (NACK) message to a base station based on a result of the decoding. Further, the example method may include calculating a signal noise ratio (SNR) value for each of the multiple streams and adjusting the SNR based on the ACK or NACK. Further, the rank or the choice of SS or DS is made after the adjustment of the SNR. Further still, the example method may include mapping the calculated and adjusted SNR value associated with the single stream if so chosen to a first channel quality indicator (CQI) value. Moreover, the example method may include mapping the calculated and adjusted SNR value associated with the two dual streams if so chosen to a second CQI value. In addition, the example method may include transmitting the first CQI value and the second CQI value to the base station.

An example apparatus may include means for decoding, at a UE, a downlink data transmission. Additionally, the example apparatus may include means for determining, over each of multiple streams including a single stream and two dual streams, and wherein the two dual streams include a primary stream and a secondary stream, whether to transmit an ACK or a NACK message to a base station based on a result of the decoding. Further, the example apparatus may include means for calculating an SNR value for each of the multiple streams and adjusting the SNR based on the ACK or NACK. Further, the rank or the choice of SS or DS is made after the adjustment of the SNR. Further still, the example apparatus may include means for mapping the calculated and adjusted SNR value associated with the single stream if so chosen to a first CQI value. Moreover, the example apparatus may include means for mapping the calculated SNR value associated with the two dual streams if so chosen to a second CQI value. In addition, the example apparatus may include means for transmitting the first CQI value and the second CQI value to the base station.

An example computer-readable medium storing computer executable code may include code for code for decoding, at a UE, a downlink data transmission. Additionally, the example computer-readable medium may include code for determining, over each of multiple streams including a single stream and two dual streams, and wherein the two dual streams include a primary stream and a secondary stream, whether to transmit an ACK or a NACK message to a base station based on a result of the decoding. Further, the example computer-readable medium may include code for calculating an SNR value for adjusting each of the multiple streams based on the determining. Further still, the example computer-readable medium may include code for mapping the calculated SNR value associated with the single stream to a first CQI value. Moreover, the example computer-readable medium may include code for mapping the calculated SNR value associated with the two dual streams to a second CQI value. In addition, the example computer-readable medium may include code for transmitting the first CQI value and the second CQI value to the base station.

Another example apparatus may include a downlink decoder configured to decode, at a UE, a downlink data transmission. Additionally, the example apparatus may include an ACK/NACK manager configured to determine, over each of multiple streams including a single stream and two dual streams, and wherein the two dual streams include a primary stream and a secondary stream, whether to transmit an ACK or a NACK message to a base station based on a result of the decoding. Further, the example apparatus may include an SNR calculator configured to calculate a SNR value for adjusting each of the multiple streams based on the determining. Further still, the example apparatus may include a CQI controller configured to map the calculated SNR value associated with the single stream to a first CQI value, and map the calculated SNR value associated with the two dual streams to a second CQI value. Moreover, the example apparatus may include a transceiver configured to transmit the first CQI value and the second CQI value to the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
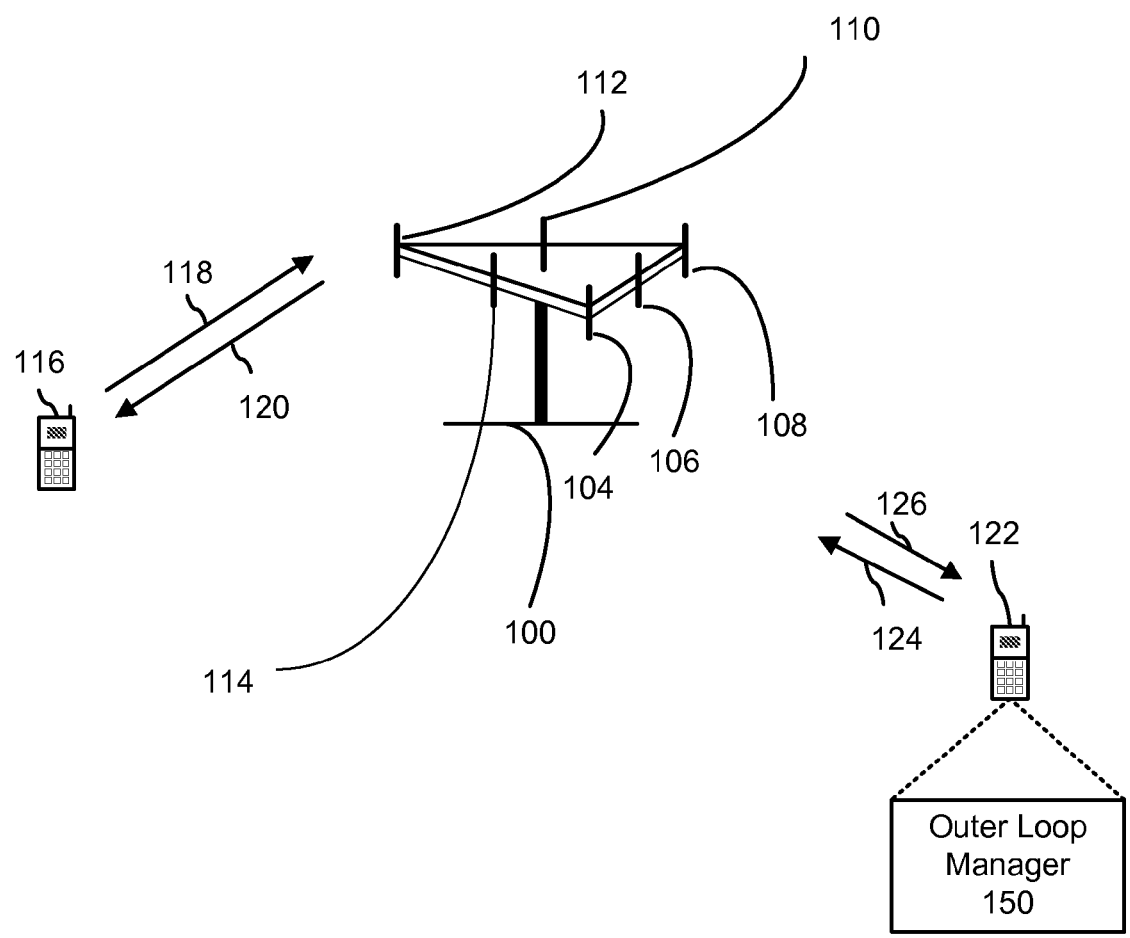
FIG. 1 illustrates a multiple access wireless communication system in which outer loop management may be implemented.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

An outer loop may be implemented to maintain a desired quality of service. Traditionally, the downlink high speed (HS) outer loop is performed at the NodeB by setting the target for HS data channel block error rate (BLER) at the UE to a certain level. The UE reports channel quality indicator (CQI) to the NodeB, which consequently uses the CQI to select appropriate modulation and coding scheme (MCS), which consists of payload and modulation order. The NodeB adaptively adjusts the MCS to the changing channel condition. If the communication link is deemed good quality, the NodeB increases the MCS; otherwise, the NodeB decreases the MCS. The channel quality is reflected by the value of the reported CQI—the greater the CQI is, the better the channel quality is. As referenced herein, a BLER may refer to is a ratio of the number of erroneous blocks to the total number of blocks received at the UE. A CQI may refer to an indicator carrying the information regarding the communication channel quality.

However, a CQI is not always reflective of the instantaneous channel condition because the channel condition might change too fast, or the UE might overestimate or underestimate the CQI due to inaccurate measurement since the CQI measurement is heavily dependent on the type of the receiver. To compensate for the mismatch between CQI and channel condition, the outer loop is used. If the reported CQI is smaller than it should actually be, the MCS selected is also smaller than the obtainable channel capacity. Consequently, the NodeB will receive more ACKs, reducing the BLER. On the contrary, if the reported CQI is larger than it should actually be, the NodeB will receive more NACKs, increasing the BLER. The ACKs/NACKs received at the NodeB should be maintained at a rate corresponding to the BLER target. The CQI to MCS mapping was designed such that the ratio of ACKs/NACKs during the first transmission is 1-to-9 (or 10% BLER). The outer loop helps maintain the BLER (during first transmission) by compensating the CQI with an adjustment which is a function of ACKs/NACKs and the BLER target. In short, during the first transmission, if the NodeB receives an ACK, the NodeB adds a positive adjustment to the CQI, resulting in a possible increased MCS; otherwise, the NodeB adds a negative adjustment to the CQI, resulting in a possible decreased MCS. The ratio between these two adjustments is a function of the BLER target. Since the MCS is adapted to the channel condition, the BLER should converge to the level set by the RNC.

Since the granularity of the CQI is coarse ([0, 1, 2, . . . , 30] for SIMO/MIMO single stream and [0, 1, 2, . . . , 14] for MIMO dual streams), any adjustment to the CQI does not closely reflect the change in channel condition. Also, there will be a delay between the time of CQI measurement at the UE and the time the reported CQI being used at the NodeB. For example, the CQI delay may be around 3 TTIs. This delay may hinder adjustment to the fast changing channel condition, e.g., high speed channels.

For the current MIMO implementation, a single outer loop is shared among single stream (SS) and the two dual streams (DS) including a primary stream and a secondary stream. It is well-known that the CQIs were designed for both SS and DS assuming a target of 10% BLER (during the first transmission). Because there is only a single outer loop, the target BLER for either SS or DS is not maintained at the set level. Instead, a combined BLER, e.g., a BLER averaged over SS and DS transmissions is maintained. This could degrade the performance in some scenarios such as when the source of interference is either heavily biased to SS or DS selection—or SIMO interferer.

To maintain a target BLER for each of the SS and the two DS, an independent outer loop may be implemented for each of the SS and the two DS. That is, one outer loop may be implemented for the SS and two outer loops respectively may be implemented for the primary stream and the secondary stream of the DS. In an aspect, when the UE operates in single input multiple output (SIMO), an additional outer loop may be implemented for SIMO transmissions.

As referenced herein, an outer loop may refer to one or more operations that adjust an SNR value based on whether an ACK message or a NACK message is transmitted by the UE. Whether the UE determines to transmit the ACK message or the NACK message may be based on whether data received over a downlink transmission (e.g., high speed physical downlink shared channel (HS PDSCH)) is correctly decoded. An SNR may refer to a ratio of signal strength relative to noise.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a base station, a Node B, or some other terminology. An access terminal may also be called an access terminal, user equipment (UE), a wireless communication device, terminal, access terminal or some other terminology.

In an aspect, access terminal 122 may include an outer loop manager 150 that may be configured to output CQI values reflecting the result of whether downlink data is correctly decoded. In an aspect, outer loop manager 150 may first determine whether a downlink data transmission is correctly decoded. If the downlink data transmission is correctly decoded, outer loop manager 150 may determine to transmit an ACK message over each of the multiple streams, e.g., the SS and the DS, to a base station, e.g., access point 100. If the downlink data transmission is not correctly or successfully decoded, outer loop manager 150 may determine to transmit a NACK message over the SS and the DS to the base station.

Further, based on the determination of whether to transmit an ACK or a NACK message, outer loop manager 150 may calculate a respective SNR value for adjusting each of the multiple streams (e.g., the SS and the DS). For example, when outer loop manager 150 determines to transmit an ACK message, outer loop manager 150 may increase the SNR value by a first amount that may be determined based on a target BLER value. The first amount may be referenced as an up step. When outer loop manager 150 determines to transmit a NACK message, outer loop manager 150 may decrease the SNR value by a second amount. The second amount may be referenced as a down step.

The outer loop manager 150 may map the calculated SNR value for the SS to a first CQI value and map the calculated SNR value for the DS to a second CQI value. Since the mapping between the SNR values and the CQI values are performed at access terminal 122, the delay between the decoding of the downlink data transmission and the mapping may be minimized and the first and second CQI values may be more accurately reflecting the channel quality between access terminal 122 and the base station since access terminal 122 may access an actual measurement of the received signals. As referenced herein, map or mapping may refer to one or more operations to determine a CQI value based on a SNR value in accordance with a correspondence specified in a wireless communication specification.

Similar operations may also be performed at AP 100. For example, based on whether an ACK or a NACK is received at AP 100, an outer loop manager similar to outer loop manager 150 may calculate or adjust a respective CQI value for adjust each of multiple streams at AP 100. The respective CQI value may be originally submitted from access terminal 122 to AP 100. Further to the example, when AP 100 receives an ACK message, the outer loop manager may increase the CQI value by an up step that may be determined based on a target BLER value. When AP 100 receives a NACK message, the outer loop manager may decrease the CQI value by a down step.

Figure 2:
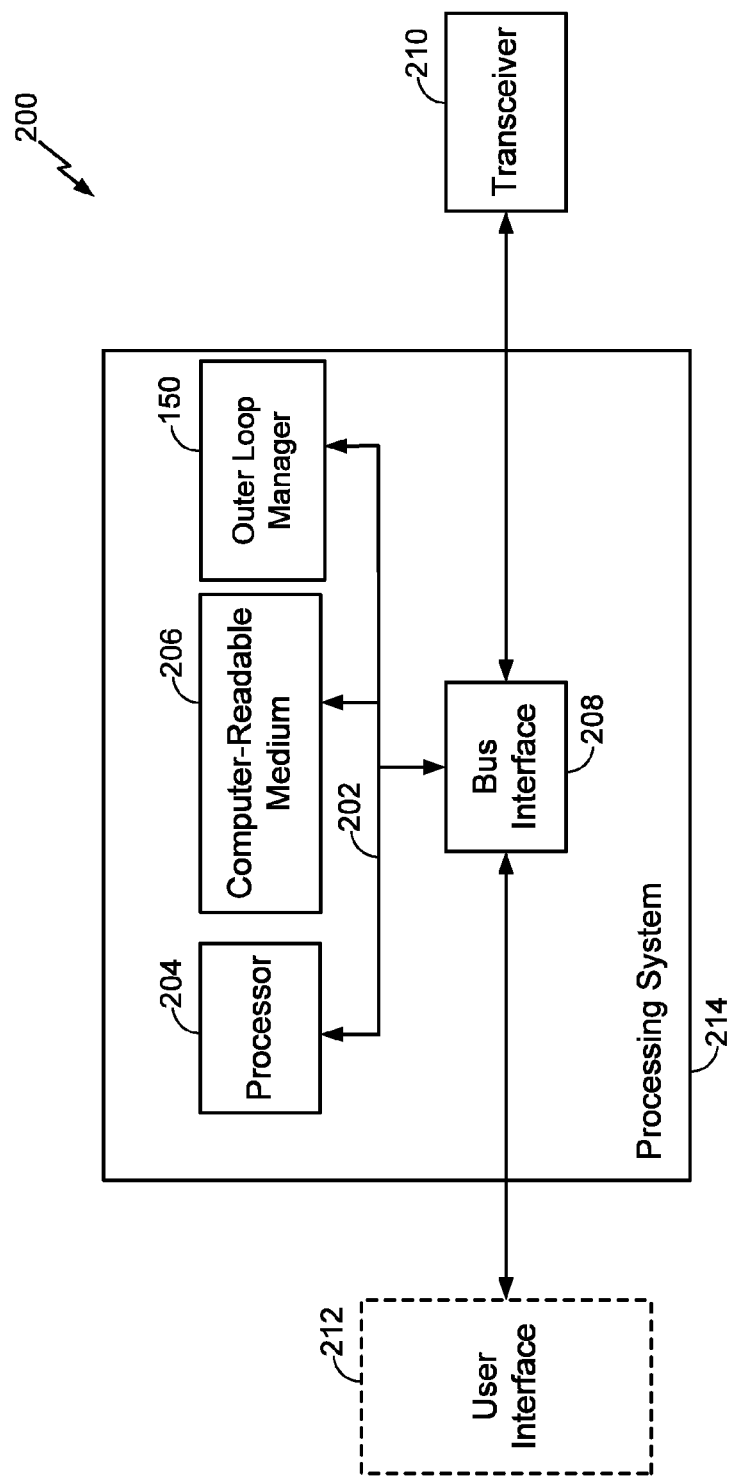
FIG. 2 is a block diagram illustrating an example of a hardware implementation for an apparatus employing a processing system having aspects configured for outer loop management.

Referring to FIG. 2, an example of a hardware implementation for an apparatus 200 employing a processing system 214 having aspects configured for outer loop management. In an aspect, apparatus 200 may be access terminal 122 of FIG. 1, including outer loop manager 150.

In this example, the processing system 214 may be implemented with a bus architecture, represented generally by the bus 202. The bus 202 may include any number of interconnecting buses and bridges depending on the specific application of the processing system 214 and the overall design constraints. The bus 202 links together various circuits including one or more processors, represented generally by the processor 204, one or more communications components, such as, for example, outer loop manager 150 of FIG. 1, and computer-readable media, represented generally by the computer-readable medium 206. The bus 202 may also link various other circuits such as timing sources, peripherals, voltage regulators, and power management circuits, which are well known in the art, and therefore, will not be described any further. A bus interface 208 provides an interface between the bus 202 and a transceiver 210. The transceiver 210 provides a means for communicating with various other apparatus over a transmission medium. Depending upon the nature of the apparatus, a user interface 212 (e.g., keypad, display, speaker, microphone, joystick) may also be provided.

The processor 204 is responsible for managing the bus 202 and general processing, including the execution of software stored on the computer-readable medium 206. The software, when executed by the processor 204, causes the processing system 214 to perform the various functions described herein for any particular apparatus. More particularly, and as described above with respect to FIG. 1, outer loop manager 150 may be software components (e.g., software modules), such that the functionality described with respect to each of the modules may be performed by processor 204.

The computer-readable medium 206 may also be used for storing data that is manipulated by the processor 204 when executing software, such as, for example, software modules represented by outer loop manager 150.

In one example, the software modules (e.g., any algorithms or functions that may be executed by processor 204 to perform the described functionality) and/or data used therewith (e.g., inputs, parameters, variables, and/or the like) may be retrieved from computer-readable medium 206.

More particularly, the processing system further includes outer loop manager 150. The various components or functionalities provided by outer loop manager 150 may be performed by software modules running in the processor 204, resident and/or stored in the computer-readable medium 206, one or more hardware modules coupled to the processor 204, or some combination thereof.

Figure 3:
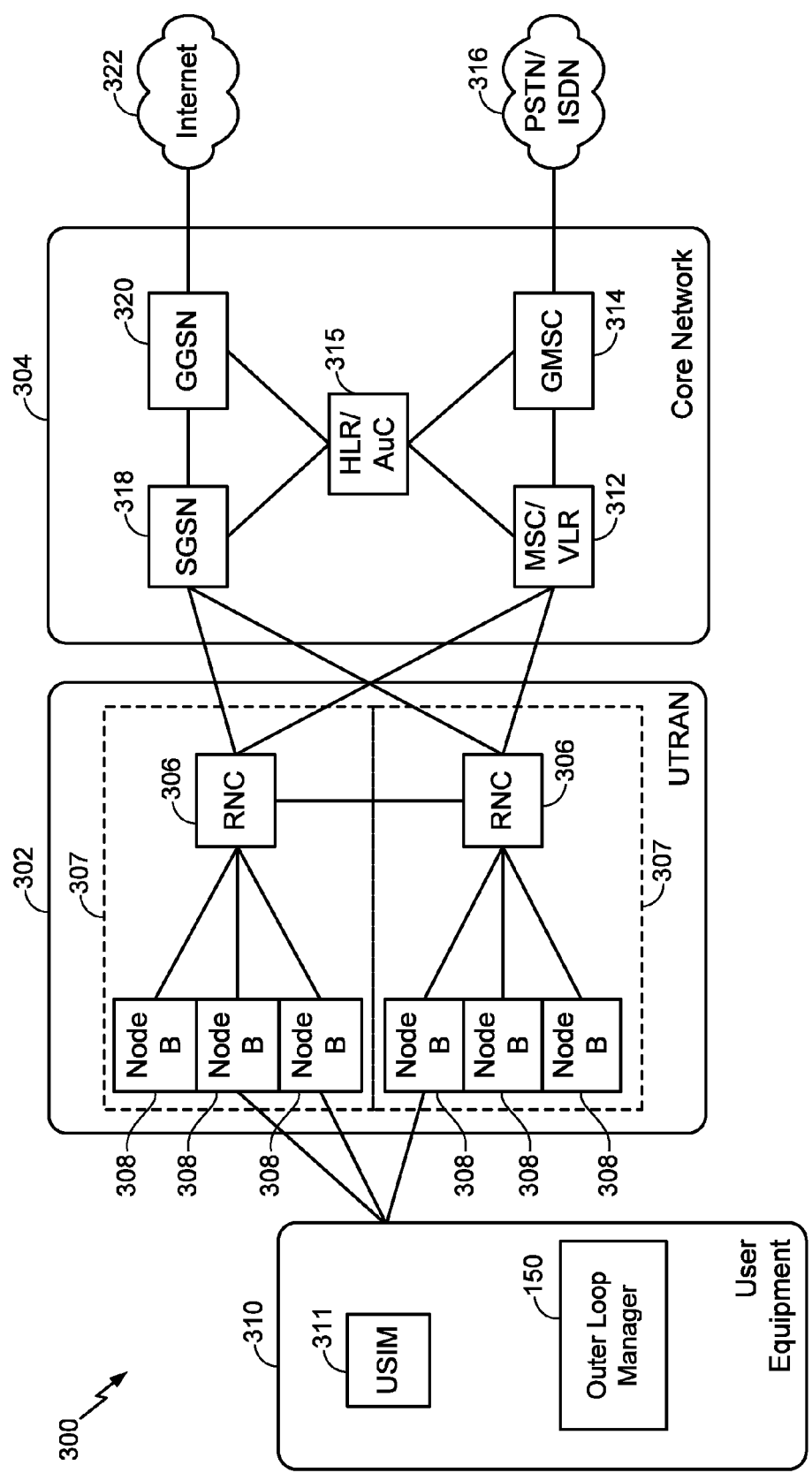
FIG. 3 is a block diagram illustrating an example of a telecommunications system having aspects configured for outer loop management.

The various concepts presented throughout this disclosure may be implemented across a broad variety of telecommunication systems, network architectures, and communication standards. By way of example and without limitation, the aspects of the present disclosure illustrated in FIG. 3 are presented with reference to a UMTS system 300 employing a W-CDMA air interface and having aspects configured for outer loop management. A UMTS network includes three interacting domains: a Core Network (CN) 304, a UMTS Terrestrial Radio Access Network (UTRAN) 302, and User Equipment (UE) 310. In an aspect, UE 310 may be an example of access terminal 122 of FIG. 1, including outer loop manager 150. In this example, the UTRAN 302 provides various wireless services including telephony, video, data, messaging, broadcasts, and/or other services. The UTRAN 302 may include a plurality of Radio Network Subsystems (RNSs) such as an RNS 307, each controlled by a respective Radio Network Controller (RNC) such as an RNC 306. Here, the UTRAN 302 may include any number of RNCs 306 and RNSs 307 in addition to the RNCs 306 and RNSs 307 illustrated herein. The RNC 306 is an apparatus responsible for, among other things, assigning, reconfiguring and releasing radio resources within the RNS 307. The RNC 306 may be interconnected to other RNCs (not shown) in the UTRAN 302 through various types of interfaces such as a direct physical connection, a virtual network, or the like, using any suitable transport network.

Communication between a UE 310 and a Node B 308, which may be an example of an entity or component of access point 100 of FIG. 1, may be considered as including a physical (PHY) layer and a medium access control (MAC) layer. Further, communication between a UE 310 and an RNC 306 by way of a respective Node B 308 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in the RRC Protocol Specification, 3GPP TS 25.331 v9.1.0, incorporated herein by reference.

The geographic region covered by the RNS 307 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 308 are shown in each RNS 307; however, the RNSs 307 may include any number of wireless Node Bs. The Node Bs 308 provide wireless access points to a CN 304 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a sensor, a vending machine, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 310 may further include a universal subscriber identity module (USIM) 311, which contains a user's subscription information to a network. For illustrative purposes, one UE 310 is shown in communication with a number of the Node Bs 308. The DL, also called the forward link, refers to the communication link from a Node B 308 to a UE 310, and the UL, also called the reverse link, refers to the communication link from a UE 310 to a Node B 308.

The CN 304 interfaces with one or more access networks, such as the UTRAN 302. As shown, the CN 304 is a GSM core network. However, as those skilled in the art will recognize, the various concepts presented throughout this disclosure may be implemented in a RAN, or other suitable access network, to provide UEs with access to types of CNs other than GSM networks.

The CN 304 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 304 supports circuit-switched services with a MSC 312 and a GMSC 314. In some applications, the GMSC 314 may be referred to as a media gateway (MGW). One or more RNCs, such as the RNC 306, may be connected to the MSC 312. The MSC 312 is an apparatus that controls call setup, call routing, and UE mobility functions. The MSC 312 also includes a VLR that contains subscriber-related information for the duration that a UE is in the coverage area of the MSC 312. The GMSC 314 provides a gateway through the MSC 312 for the UE to access a circuit-switched network 316. The GMSC 314 includes a home location register (HLR) 315 containing subscriber data, such as the data reflecting the details of the services to which a particular user has subscribed. The HLR is also associated with an authentication center (AuC) that contains subscriber-specific authentication data. When a call is received for a particular UE, the GMSC 314 queries the HLR 315 to determine the UE's location and forwards the call to the particular MSC serving that location.

The CN 304 also supports packet-data services with a serving GPRS support node (SGSN) 318 and a gateway GPRS support node (GGSN) 320. GPRS, which stands for General Packet Radio Service, is designed to provide packet-data services at speeds higher than those available with standard circuit-switched data services. The GGSN 320 provides a connection for the UTRAN 302 to a packet-based network 322. The packet-based network 322 may be the Internet, a private data network, or some other suitable packet-based network. The primary function of the GGSN 320 is to provide the UEs 310 with packet-based network connectivity. Data packets may be transferred between the GGSN 320 and the UEs 310 through the SGSN 318, which performs primarily the same functions in the packet-based domain as the MSC 312 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 308 and a UE 310. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 310 provides feedback to the Node B 308 over the HS-DPCCH to indicate whether it correctly decoded a packet on the downlink.

HS-DPCCH further includes feedback signaling from the UE 310 to assist the Node B 308 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the Node B 308 and/or the UE 310 may have multiple antennas supporting MIMO technology. The use of MIMO technology enables the Node B 308 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multi-path fading and increase transmission quality, and spatial multiplexing gains to increase data throughput.

Spatial multiplexing may be used to transmit different streams of data simultaneously on the same frequency. The data steams may be transmitted to a single UE 310 to increase the data rate or to multiple UEs 310 to increase the overall system capacity. This is achieved by spatially precoding each data stream and then transmitting each spatially precoded stream through a different transmit antenna on the downlink. The spatially precoded data streams arrive at the UE(s) 310 with different spatial signatures, which enables each of the UE(s) 310 to recover the one or more the data streams destined for that UE 310. On the uplink, each UE 310 may transmit one or more spatially precoded data streams, which enables the Node B 308 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted concurrently over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

The radio protocol architecture may take on various forms depending on the particular application. An example for an HSPA system will now be presented with reference to FIG. 4.

Figure 4:
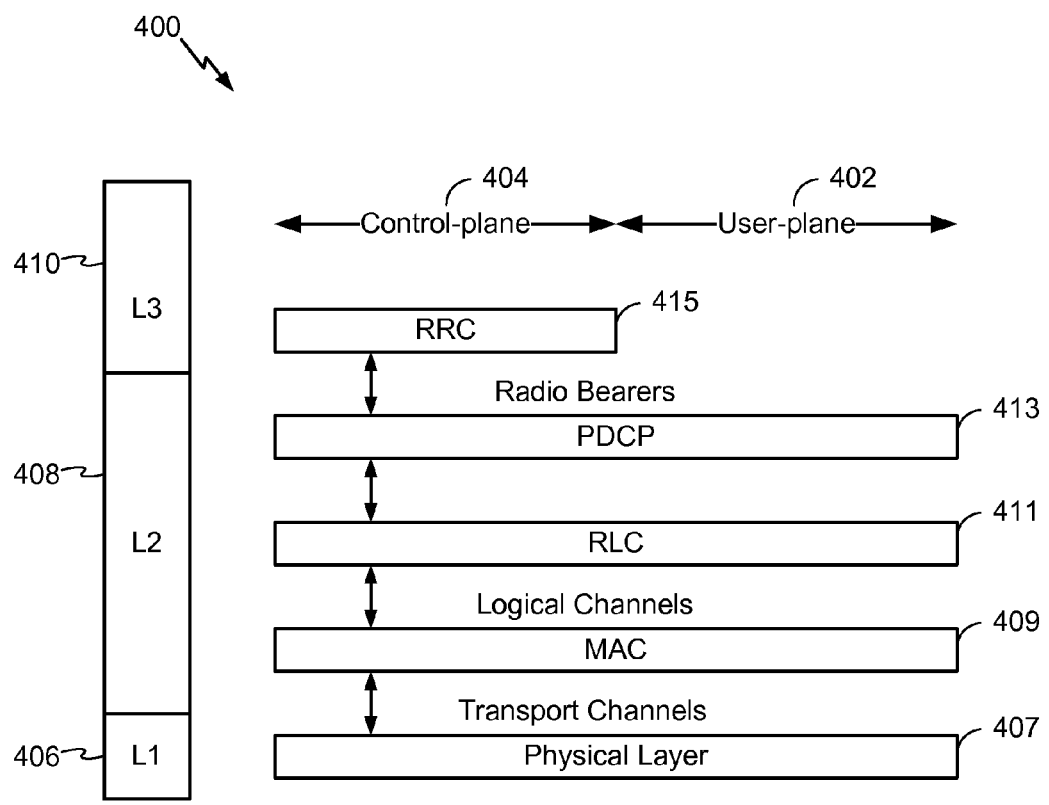
FIG. 4 is a block diagram illustrating an example of a radio protocol architecture for user and control planes for outer loop management.

Referring to FIG. 4, an example radio protocol architecture 400 relates to the user plane 402 and the control plane 404 of a user equipment (UE) or Node B/base station in communication with one another and having aspects configured for outer loop management. In an aspect, architecture 400 may be included in a UE such as access terminal 122 of FIG. 1 having outer loop manager 150. In an aspect, architecture 400 may be included in a network including access point 100 of FIG. 1. The radio protocol architecture 400 for the UE and Node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and Node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the Node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between Node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 5:
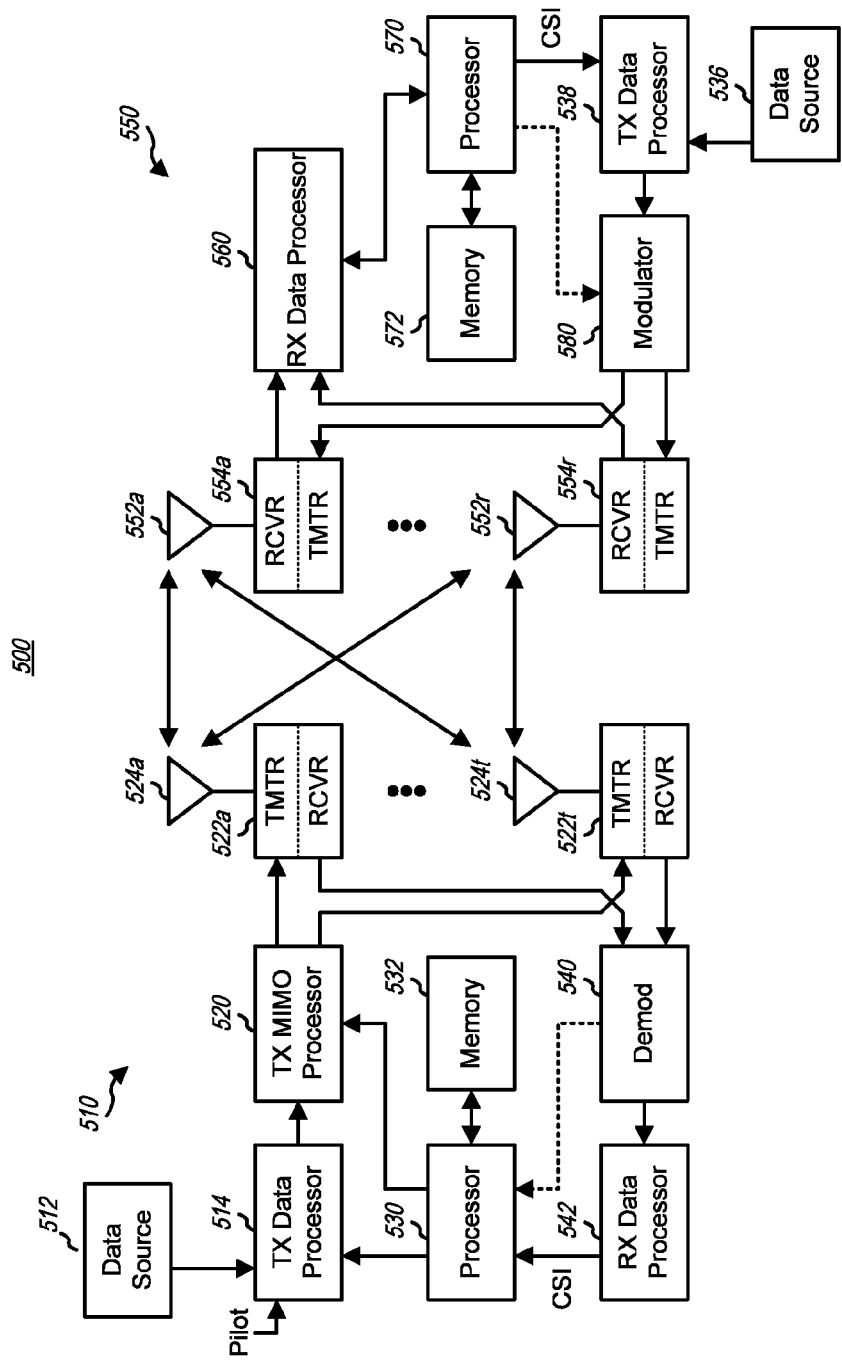
FIG. 5 is a block diagram illustrating an example of a base station (e.g., Node B) in communication with a UE in a multiple input multiple output (MIMO) telecommunications system having aspects configured for outer loop management.

Referring to FIG. 5, an example of a base station (e.g., Node B) in communication with a UE in a multiple input multiple output (MIMO) telecommunications system having aspects configured for outer loop management is illustrated. The example may include a transmitter system 510 (also known as the access point) and a receiver system 550 (also known as access terminal) in a MIMO system 500. At the transmitter system 510, traffic data for a number of data streams is provided from a data source 512 to a transmit (TX) data processor 514.

In an embodiment, each data stream is transmitted over a respective transmit antenna. TX data processor 514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 530.

The modulation symbols for all data streams are then provided to a TX MIMO processor 520, which may further process the modulation symbols (e.g., for OFDM). TX MIMO processor 520 then provides $N_T$ modulation symbol streams to $N_T$ transmitters (TMTR) 522a through 522t. In certain embodiments, TX MIMO processor 520 applies beamforming weights to the symbols of the data streams and to the antenna from which the symbol is being transmitted.

Each transmitter 522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 522a through 522t are then transmitted from $N_T$ antennas 524a through 524t, respectively.

At receiver system 550, the transmitted modulated signals are received by $N_R$ antennas 552a through 552r and the received signal from each antenna 552 is provided to a respective receiver (RCVR) 554a through 554r. Each receiver 554 conditions (e.g., filters, amplifies, and downconverts) a respective received signal, digitizes the conditioned signal to provide samples, and further processes the samples to provide a corresponding "received" symbol stream.

An RX data processor 560 then receives and processes the $N_R$ received symbol streams from $N_R$ receivers 554 based on a particular receiver processing technique to provide $N_T$ "detected" symbol streams. The RX data processor 560 then demodulates, deinterleaves, and decodes each detected symbol stream to recover the traffic data for the data stream. The processing by RX data processor 560 is complementary to that performed by TX MIMO processor 520 and TX data processor 514 at transmitter system 510.

A processor 570 periodically determines which pre-coding matrix to use (discussed below). Processor 570 formulates a reverse link message comprising a matrix index portion and a rank value portion.

The reverse link message may comprise various types of information regarding the communication link and/or the received data stream. The reverse link message is then processed by a TX data processor 538, which also receives traffic data for a number of data streams from a data source 536, modulated by a modulator 580, conditioned by transmitters 554a through 554r, and transmitted back to transmitter system 510. In an aspect, transmitter system 510 may be included access terminal 122 and access point 100 and receiver system 550 may be similarly included in access terminal 122 and access point 100.

At transmitter system 510, the modulated signals from receiver system 550 are received by antennas 524, conditioned by receivers 522, demodulated by a demodulator 540, and processed by a RX data processor 542 to extract the reserve link message transmitted by the receiver system 550. Processor 530 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprises a set of DL channels and UL channels.

The DL PHY channels comprises Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH).

The UL PHY Channels comprises Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

In an aspect, a channel structure is provided that preserves low PAR (at any given time, the channel is contiguous or uniformly spaced in frequency) properties of a single carrier waveform.

Figure 6:
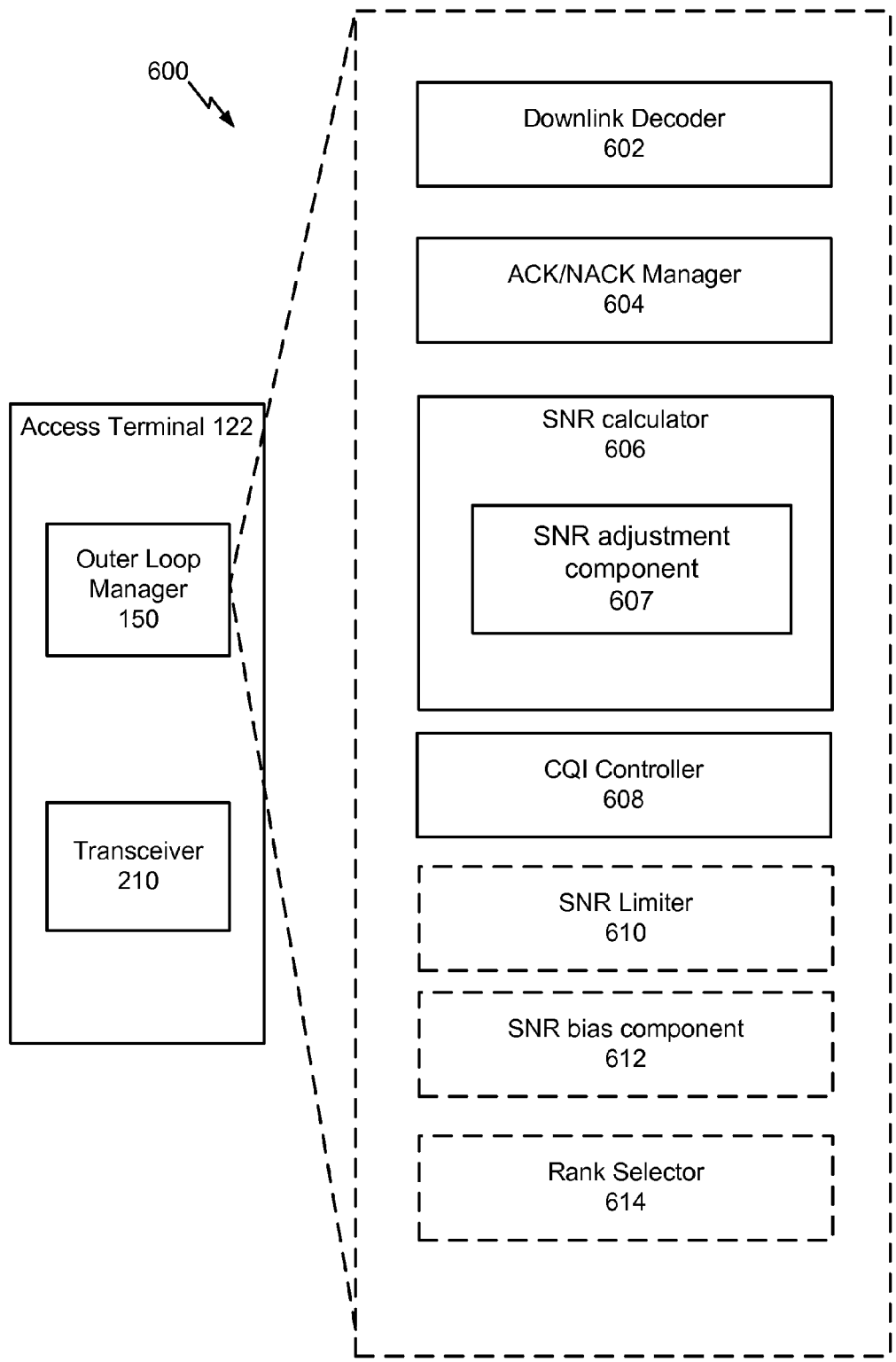
FIG. 6 is a diagram illustrating one or more components by which outer loop management may be implemented.

Referring to FIG. 6, one or more components, by which outer loop management may be implemented, are illustrated in addition to FIG. 1. As depicted, access terminal 122 of FIG. 1 may include a downlink decoder 602, an ACK/NACK manager 604, an SNR calculator 606 including an SNR adjustment component 607, a CQI controller 608, an SNR limiter 610, an SNR bias component 612, and a rank selector 614, each of which may be implemented as software, hardware, firmware, or any combination thereof at access terminal 122.

When access terminal 122 operates in an MO mode in communication with access point 100, access terminal 122 may receive a downlink data transmission from access point 100. Downlink decoder 602 may be configured to decode the downlink data transmission. If the downlink data transmission is correctly decoded by downlink decoder 602, ACK/NACK manager 604 may determine to transmit an ACK message to access point 100. If the downlink data transmission cannot be correctly decoded by downlink decoder 602, ACK/NACK manager 604 may determine to transmit a NACK message to access point 100.

Based on the determination of whether to transmit an ACK or a NACK message, SNR calculator 606 may be configured to calculate an SNR value for each of the multiple streams include the SS and the DS. That is, SNR adjustment component 607 of SNR calculator 606 may first determine whether to increase or decrease a previous SNR value. With respect to each of the multiple streams, if ACK/NACK manager 604 determines that an ACK message should be transmitted to the access point 100, SNR adjustment component 607 may determine to increase the SNR value by an amount, which may be referred to as an up step. If ACK/NACK manager 604 determines that a NACK message should be transmitted to the access point 100, SNR adjustment component 607 may determine to decrease the SNR value by an amount, which may be referred to as a down step.

In an aspect, the up step may be determined based on a target BLER value and a configurable step size. For example, the up step may be determined in accordance with the following equation:

$$\text{UP\_STEP} = \frac{BLER_{Target}}{100\% - BLER_{Target}} \times \text{SNR\_STEPSIZE},$$

in which the SNR_STEPSIZE is the configurable SNR step size (positive valued) and $BLER_{target}$ may refer to the target BLER value. The configuration of the SNR step size may have impact on how fast outer loop manager 150 can track the changing channel condition. Further, the down step may be determined by the following equation:

$$\text{DOWN\_STEP} = -\text{SNR\_STEPSIZE}$$

When the up step or the down step is determined by SNR adjustment component 607, the up step or the down step may be added to a previously implemented SNR adjustment to determine a final SNR adjustment. In some examples, the final SNR adjustment may be limited to a configurable range by SNR limiter 610. That is, the final SNR adjustment may be determined not to be greater than an upper bound of the range and not to be less than a lower bound of the range.

With respect to the SS, the final SNR adjustment may be added to a previously determined SNR value in determining the SNR value for the SS. In some examples, SNR bias component 612 may be configured to provide a SNR bias value to offset the SNR value for the SS such that SS transmissions may be chosen more frequently than DS transmissions.

With respect to the DS, two final SNR adjustments (e.g., the final SNR adjustment for the primary stream and the final SNR adjustment for the secondary stream) may be respectively added to a previously determined SNR value for the primary stream and a previously determined SNR value for the secondary SNR value to determine two SNR values for the DS.

Based on the three SNR values for the DS and the SS, CQI controller 608 may be configured to map the SNR value for the SS to a first CQI and map the two SNR values for the DS to a second CQI. The first and second CQI may be transmitted by transceiver 210 to the base station, e.g., access point 100.

In some examples, when the SNR values and/or the first and second CQI values are determined, rank selector 614 may determine whether to select the SS and/or the DS for the transmission in a subsequent time interval. The rank selection may be based on the relative rates of the SS and DS transmissions where the rates are computed based on the SNR value for the SS and the two SNR values for the DS transmissions. The rank is selected after the adjustment of the SNR such that the selected rank may correspond to the channel condition and the individual target BLER values. In some examples, rank selection after the SNR adjustment may allow for more accurate rank selection since the rank would be chosen to meet the target BLER and would also allow that the channel can support the transmitted packets.

Figure 7:
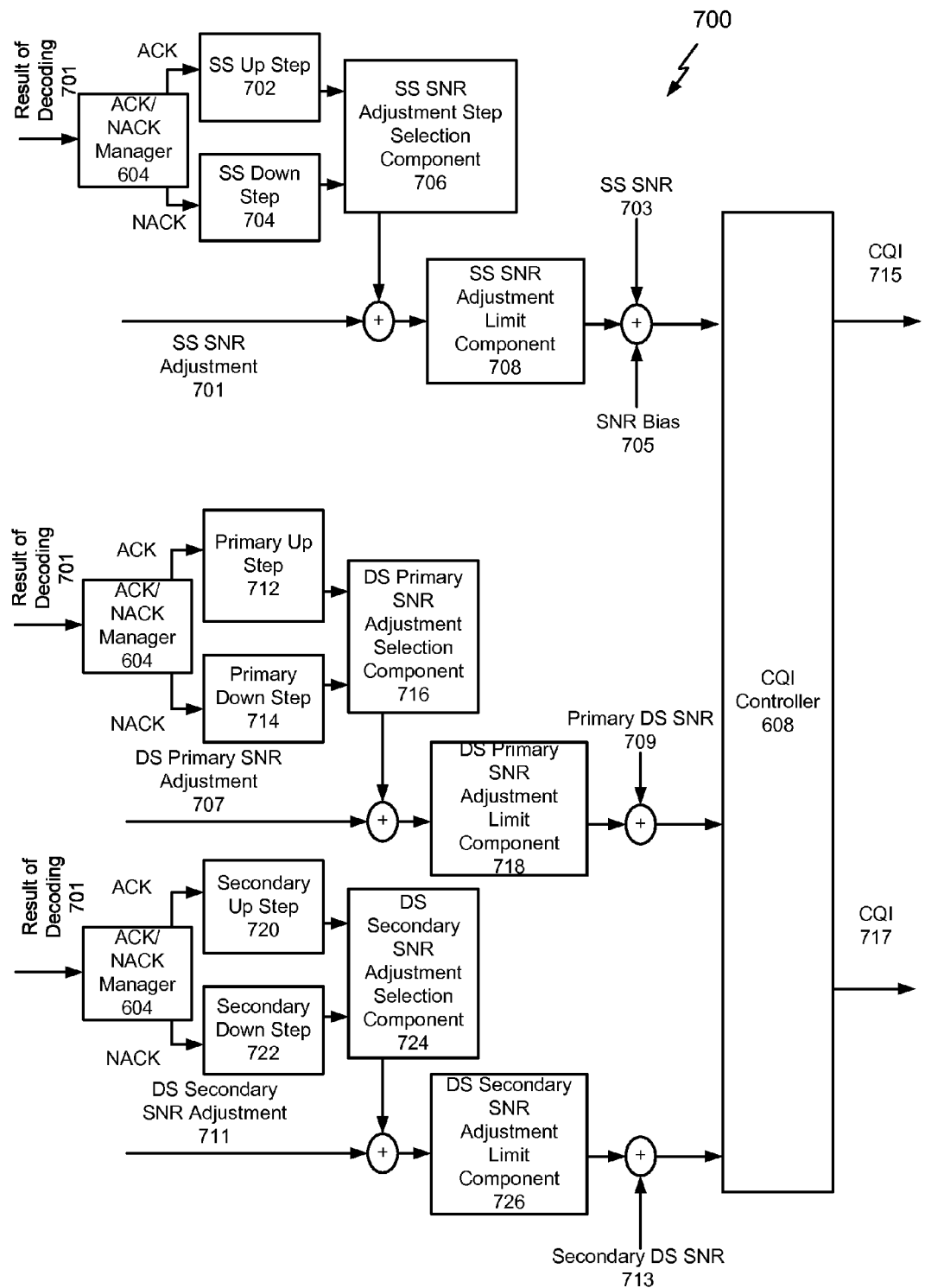
FIG. 7 is another diagram illustrating one or more components by which outer loop management may be implemented.

Referring to FIG. 7, one or more components by which outer loop management may be implemented are illustrated. As depicted, the one or more components may at least include ACK/NACK manager 604, SS up step 702, SS down step 704, SS SNR adjustment step selection component 706, SS SNR adjustment limit component 708, CQI controller 608, primary up step 712, primary down step 714, DS primary SNR adjustment selection component 716, DS primary SNR adjustment limit component 718, secondary up step 720, secondary down step 722, DS secondary SNR adjustment selection component 724, and DS secondary SNR adjustment limit component 726.

With respect to the SS, ACK/NACK manager 604 may be configured to receive a result of the decoding, e.g., result of decoding 701 that indicates whether the downlink data transmission is correctly decoded by downlink decoder 602. In some examples, the result of the decoding may be indicated in a decoding flag of the first transmission of the SS. ACK/NACK manager 604 may then determine whether to transmit an ACK or a NACK message over the SS based on the result of the decoding. If an ACK message is determined to be transmitted, SS up step 702 may determine to increase the SNR value for the SS and SS SNR adjustment step selection component 706 may accordingly determine a size for the up step. If a NACK message is determined to be transmitted, SS down step 704 may determine to decrease the SNR value for the SS and SS SNR adjustment step selection component 706 may accordingly determine a size for the down step. The size of the up step or the down step may be determined in accordance with the aforementioned equations.

The determined up step or down step may be added to SS SNR adjustment 701, which refers to an adjustment of the SNR value of the SS in a previous adjustment operation, to generate a final SS SNR adjustment. In some examples, the final SS SNR adjustment may be limited to a range by SS SNR adjustment limit component 708 or SNR limiter 610. The final SS SNR adjustment may be added to SS SNR 703 to generate the SNR value for the SS. SS SNR 703 may refer to a previous SNR value determined in a previous outer loop management operation for the SS. In some examples, SNR bias 705 may also be added with the final SS SNR adjustment and SS SNR 703 to offset the SNR value for the SS. The SNR value for the SS may then be transmitted to CQI controller 608, which may further map the SNR value for the SS to a first CQI value, e.g., CQI 715.

Regarding the primary stream of the DS, ACK/NACK manager 604 may be configured to receive a result of the decoding of the primary stream from downlink decoder 602. Similarly, the result of the decoding may be indicated in a decoding flag of the first transmission of the primary stream. ACK/NACK manager 604 may then determine whether to transmit an ACK or a NACK message over the primary stream based on the result of the decoding. If an ACK message is determined to be transmitted, primary up step 712 may determine to increase the SNR value for the primary stream and DS primary SNR adjustment selection component 716 may accordingly determine a size for the up step. If a NACK message is determined to be transmitted, primary down step 714 may determine to decrease the SNR value for the primary stream and DS primary SNR adjustment selection component 716 may accordingly determine a size for the down step. Similar to the SS, the size of the up step or the down step may be determined in accordance with the aforementioned equations.

The determined up step or down step may be added to DS primary SNR adjustment 707, which refers to an adjustment of the SNR value of the primary stream in a previous adjustment operation, to generate a final primary stream SNR adjustment. In some example, the final primary stream SNR adjustment may be limited to a range by DS primary SNR adjustment limit component 718 or SNR limiter 610. The final primary stream SNR adjustment may be added to primary DS SNR 709 to generate the SNR value for the primary stream. primary DS SNR 709 may refer to a previous SNR value determined in a previous outer loop management operation for the primary stream. The SNR value for the primary stream may then be transmitted to CQI controller 608, which may further map the SNR values for the DS to a second CQI value, e.g., CQI 717.

Regarding the secondary stream of the DS, ACK/NACK manager 604 may be configured to receive a result of the decoding of the secondary stream from downlink decoder 602. Similarly, the result of the decoding may be indicated in a decoding flag of the first transmission of the secondary stream. ACK/NACK manager 604 may then determine whether to transmit an ACK or a NACK message over the secondary stream based on the result of the decoding. If an ACK message is determined to be transmitted, secondary up step 720 may determine to increase the SNR value for the secondary stream and DS secondary SNR adjustment selection component 724 may accordingly determine a size for the up step. If a NACK message is determined to be transmitted, secondary down step 722 may determine to decrease the SNR value for the secondary stream and DS secondary SNR adjustment selection component 724 may accordingly determine a size for the down step. Similar to the SS, the size of the up step or the down step may be determined in accordance with the aforementioned equations.

The determined up step or down step may be added to DS secondary SNR adjustment 711, which refers to an adjustment of the SNR value of the secondary stream in a previous adjustment operation, to generate a final secondary stream SNR adjustment. In some example, the final secondary stream SNR adjustment may be limited to a range by DS secondary SNR adjustment limit component 726 or SNR limiter 610. The final secondary stream SNR adjustment may be added to secondary DS SNR 713 to generate the SNR value for the secondary stream. Secondary DS SNR 713 may refer to a previous SNR value determined in a previous outer loop management operation for the secondary stream. The SNR value for the secondary stream may then be transmitted to CQI controller 608, which may further map the SNR values for the DS to a second CQI value, e.g., CQI 717.

Figure 8:
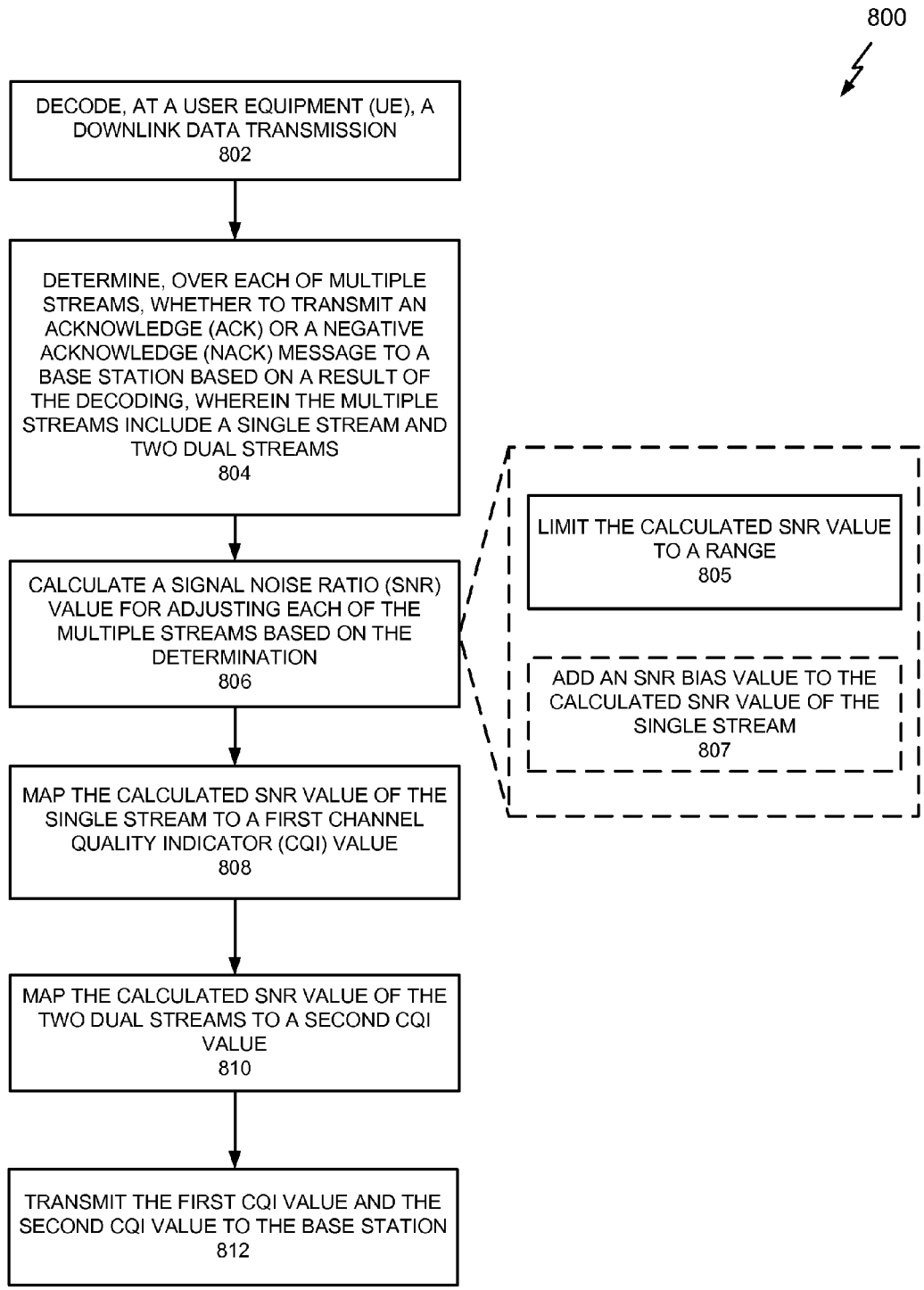
FIG. 8 is a flow chart of aspects of a method for outer loop management.

Referring to FIG. 8, aspects of a method 800 for outer loop management may be performed by access terminal 122 of FIG. 1 and the components thereof. More particularly, aspects of method 800 may be performed by downlink decoder 602, ACK/NACK manager 604, SNR calculator 606 including SNR adjustment component 607, CQI controller 608, SNR limiter 610, SNR bias component 612, and rank selector 614 as shown in FIG. 6. As illustrated in FIG. 8, dash-lined blocks may indicate optional operations of method 800.

At 802, method 800 includes decoding, at a UE, a downlink data transmission. For example, Downlink decoder 602 may be configured to decode a downlink data transmission from access point 100 to access terminal 122.

At 804, method 800 includes determining, over each of multiple streams, whether to transmit an ACK or a NACK message to a base station based on a result of the decoding, wherein the multiple streams include a single stream and two dual streams. For example, if the downlink data transmission is correctly decoded by downlink decoder 602, ACK/NACK manager 604 may determine to transmit an ACK message to access point 100. If the downlink data transmission cannot be correctly decoded by downlink decoder 602, ACK/NACK manager 604 may determine to transmit a NACK message to access point 100.

At 806, method 800 includes calculating an SNR value for adjusting each of the multiple streams based on the determining. For example, based on the determination of whether to transmit an ACK or a NACK message, SNR calculator 606 may be configured to calculate an SNR value for each of the multiple streams include the SS and the DS. That is, SNR adjustment component 607 of SNR calculator 606 may first determine whether to increase or decrease a previous SNR value. With respect to each of the multiple streams, if ACK/NACK manager 604 determines to transmit an ACK message to access point 100, SNR adjustment component 607 may determine to increase the SNR value by an amount, which may be referred to as an up step. If ACK/NACK manager 604 determines to transmit a NACK message to access point 100, SNR adjustment component 607 may determine to decrease the SNR value by an amount, which may be referred to as a down step.

At 805, method 800 includes limiting the calculated SNR value to a range. For example, the final SNR adjustment may be limited to a configurable range by SNR limiter 610. That is, the final SNR adjustment may be determined not to be greater than an upper bound of the range and not to be less than a lower bound of the range.

At 807, method 800 includes adding an SNR bias value to the calculated SNR value of the single stream. In some examples, SNR bias component 612 may be configured to provide a SNR bias value to offset the SNR value for the SS.

At 808, method 800 includes mapping the calculated SNR value of the single stream to a first CQI value. That is, CQI controller 608 may be configured to map the SNR value for the SS to a first CQI value.

At 810, method 800 includes mapping the calculated SNR value of the two dual streams to a second CQI value. For example, CQI controller 608 may be configured to map the two SNR values for the DS to a second CQI value.

At 812, method 800 includes transmitting the first CQI value and the second CQI value to the base station. For example, transceiver 210 may be configured to transmit the first CQI value and the second CQI value to the base station, e.g., access point 100.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C—Control—
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multmedia Broadcast Multicast Service
MCCHMBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U—User—
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MB SFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for maintaining quality of service of a multiple output (MO) communication system, comprising:
   decoding, at a user equipment (UE), a downlink data transmission;
   determining, over each of multiple streams, whether to transmit an acknowledge (ACK) or a negative acknowledge (NACK) message to a base station based on a result of the decoding, wherein the multiple streams include a single stream and two dual streams, and wherein the two dual streams include a primary stream and a secondary stream;
   calculating a signal noise ratio (SNR) value for adjusting each of the multiple streams based on the determining;
   mapping the calculated SNR value associated with the single stream to a first channel quality indicator (CQI) value;

mapping the calculated SNR value associated with the two dual streams to a second CQI value, wherein the second CQI value is a single value for the two dual streams; and transmitting the first CQI value and the second CQI value to the base station.

2. The method of claim 1, wherein the adjusting includes:
increasing the SNR value when a determination is made to transmit the ACK message; and
decreasing the SNR value when a determination is made to transmit the NACK message.

3. The method of claim 2, wherein the increasing of the SNR value is based on a target block error rate (BLER) value.

4. The method of claim 1, further comprising limiting the calculated SNR value to a range.

5. The method of claim 1, further comprising adding an SNR bias value to the calculated SNR value of the single stream.

6. The method of claim 1, wherein the single stream is a stream of a single input multiple output (SIMO) communication or a multiple input multiple output (MIMO) communication.

7. The method of claim 1, further comprising, subsequent to the calculating, selecting a rank corresponding to the calculated SNR values associated with an uplink data transmission.

8. An apparatus for maintaining quality of service of a multiple output (MO) communication system, comprising:
means for decoding, at a user equipment (UE), a downlink data transmission;
means for determining, over each of multiple streams, whether to transmit an acknowledge (ACK) or a negative acknowledge (NACK) message to a base station based on a result of the decoding, wherein the multiple streams include a single stream and two dual streams, and wherein the two dual streams include a primary stream and a secondary stream;
means for calculating a signal noise ratio (SNR) value for adjusting each of the multiple streams based on the determining;
means for mapping the calculated SNR value associated with the single stream to a first channel quality indicator (CQI) value;
means for mapping the calculated SNR value associated with the two dual streams to a second CQI value, wherein the second CQI value is a single value for the two dual streams; and
means for transmitting the first CQI value and the second CQI value to the base station.

9. The apparatus of claim 8, wherein the means for calculating the SNR value for adjusting each of the multiple streams includes
means for increasing the SNR value when a determination is made to transmit the ACK message; and
means for decreasing the SNR value when a determination is made to transmit the NACK message.

10. The apparatus of claim 9, wherein the means for increasing is based on a target block error rate (BLER) value.

11. The apparatus of claim 8, further comprising means for limiting the calculated SNR value to a range.

12. The apparatus of claim 8, further comprising means for adding an SNR bias value to the calculated SNR value of the single stream.

13. The apparatus of claim 8, wherein the single stream is a stream of a single input multiple output (SIMO) communication or a multiple input multiple output (MIMO) communication.

14. The apparatus of claim 8, further comprising means for, subsequent to the calculating, selecting a rank corresponding to the calculated SNR value associated with an uplink data transmission.

15. A non-transitory computer-readable medium storing computer executable code for maintaining quality of service of a multiple output (MO) communication system, comprising:
code for decoding, at a user equipment (UE), a downlink data transmission;
code for determining, over each of multiple streams, whether to transmit an acknowledge (ACK) or a negative acknowledge (NACK) message to a base station based on a result of the decoding, wherein the multiple streams include a single stream and two dual streams, and wherein the two dual streams include a primary stream and a secondary stream;
code for calculating a signal noise ratio (SNR) value for adjusting each of the multiple streams based on the determining;
code for mapping the calculated SNR value associated with the single stream to a first channel quality indicator (CQI) value;
code for mapping the calculated SNR value associated with the two dual streams to a second CQI value, wherein the second CQI value is a single value for the two dual streams; and
code for transmitting the first CQI value and the second CQI value to the base station.

16. The non-transitory computer-readable medium of claim 15, wherein the code for calculating the SNR value for adjusting each of the multiple streams includes:
code for increasing the SNR value when a determination is made to transmit the ACK message; and
code for decreasing the SNR value when a determination is made to transmit the NACK message.

17. The non-transitory computer-readable medium of claim 16, wherein the code for increasing of the SNR value increases the SNR value based on a target block error rate (BLER) value.

18. The non-transitory computer-readable medium of claim 15, further comprising code for limiting the calculated SNR value to a range.

19. The non-transitory computer-readable medium of claim 15, further comprising code for adding an SNR bias value to the calculated SNR value of the single stream.

20. The non-transitory computer-readable medium of claim 15, wherein the single stream is a stream of a single input multiple output (SIMO) communication or a multiple input multiple output (MIMO) communication.

21. The non-transitory computer-readable medium of claim 15, further comprising code for, subsequent to the calculating, selecting a rank corresponding to the calculated SNR value associated with an uplink data transmission.

22. An apparatus for maintaining quality of service of a multiple output (MO) communication system, comprising:
a memory;
a processor coupled to the memory and configured to:
decode, at a user equipment (UE), a downlink data transmission;
determine, over each of multiple streams, whether to transmit an acknowledge (ACK) or a negative acknowledge (NACK) message to a base station based on a result of the decoding, wherein the multiple streams include a single stream and two dual streams, and wherein the two dual streams include a primary stream and a secondary stream;

calculate an SNR value for adjusting each of the multiple streams based on the determining;

map the calculated SNR value associated with the single stream to a first CQI value; and map the calculated SNR value associated with the two dual streams to a second CQI value, wherein the second CQI value is a single value for the two dual streams; and a transceiver configured to transmit the first CQI value and the second CQI value to the base station.

23. The apparatus of claim 22, wherein the processor is further configured to:

increase the SNR value when a determination is made to transmit the ACK message; and decrease the SNR value when a determination is made to transmit the NACK message.

24. The apparatus of claim 23, wherein the processor is further configured to increase the SNR value based on a target block error rate (BLER) value.

25. The apparatus of claim 22, wherein the processor is further configured to limit the calculated SNR value to a range.

26. The apparatus of claim 22, wherein the processor is further configured to add an SNR bias value to the calculated SNR value of the single stream.

27. The apparatus of claim 22, wherein the single stream is a stream of a single input multiple output (SIMO) communication or a multiple input multiple output (MIMO) communication.

28. The apparatus of claim 22, wherein the processor is further configured to select, subsequent to the calculation of the SNR value, a rank corresponding to the calculated SNR value associated with an uplink data transmission.

\* \* \* \* \*